(12) United States Patent
Katano

(10) Patent No.: US 8,594,874 B2  
(45) Date of Patent: Nov. 26, 2013

(54) FUEL CELL SYSTEM

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 164 days.

(21) Appl. No.: 13/378,222

(22) PCT Filed: May 4, 2010

(86) PCT No.: PCT/IB2010/001021  
§ 371 (c)(1), (2), (4) Date: Dec. 14, 2011

(87) PCT Pub. No.: WO2010/146421  
PCT Pub. Date: Dec. 23, 2010

(65) Prior Publication Data  
US 2012/0095637 A1    Apr. 19, 2012

(30) Foreign Application Priority Data  
Jun. 16, 2009 (JP) .................. 2009-142895

(51) Int. Cl.  
*B60L 11/18* (2006.01)  
*G06F 17/00* (2006.01)

(52) U.S. Cl.  
USPC ............... 701/22; 701/70; 429/23; 180/65.31

(58) Field of Classification Search  
USPC ............... 701/22, 70; 429/23, 431; 180/65.31  
See application file for complete search history.

(56) References Cited

U.S. PATENT DOCUMENTS

| | | | |
|---|---|---|---|
| 6,321,145 B1 | 11/2001 | Rajashekara | |
| 7,380,621 B2* | 6/2008 | Yoshida | 180/65.31 |
| 7,485,383 B2* | 2/2009 | Aoyagi et al. | 429/431 |
| 8,122,985 B2* | 2/2012 | Nagashima et al. | 180/65.275 |
| 2007/0080694 A1* | 4/2007 | Della Malva | 324/537 |
| 2009/0105895 A1 | 4/2009 | Shige | |
| 2009/0148735 A1 | 6/2009 | Manabe et al. | |

FOREIGN PATENT DOCUMENTS

| | | |
|---|---|---|
| DE | 11 2006 001 987 T5 | 5/2008 |
| DE | 11 2006 003 337 T5 | 9/2008 |
| DE | 10 2007 024 567 A1 | 11/2008 |
| JP | 2002-252932 A | 9/2002 |
| JP | 2004-146118 A | 5/2004 |

(Continued)

OTHER PUBLICATIONS

Peter F. Brosch: "Moderne Stromrichterantriebe", pp. 168-170, Vogel Verlag and Druck GmbH, 4. Auflage, 2002 (cited in DE Office Action—partial translation of which is being submitted).

(Continued)

*Primary Examiner* — Tan Q Nguyen  
(74) *Attorney, Agent, or Firm* — Kenyon & Kenyon LLP

(57) ABSTRACT

A fuel cell system includes a converter for boosting the output voltage of a fuel cell stack and supplies the boosted voltage to a first inverter for a drive motor and a second inverter for an air compressor motor, voltage acquisition means, and converter control means. The voltage acquisition means acquires a required voltage of the air compressor motor according to a target air compressor motor torque based on acceleration demand of the air compressor motor. The converter control means sets the voltage boost ratio of the converter and controls the converter by comparing the required voltage of the air compressor motor and a required voltage of the drive motor.

15 Claims, 4 Drawing Sheets

(56) References Cited

FOREIGN PATENT DOCUMENTS

| JP | 2006-048483 A | 2/2006 |
|---|---|---|
| JP | 2007-126085 A | 5/2007 |
| JP | 2007-259631 A | 10/2007 |
| JP | 2009-112164 A | 5/2009 |
| JP | 2010-179806 A | 8/2010 |
| WO | 2007/066795 A1 | 6/2007 |
| WO | 2007/111286 A1 | 10/2007 |

OTHER PUBLICATIONS

Office Action issued Sep. 27, 2011 in JP 2009-142895 and partial English translation thereof.
International Search Report and Written Opinion mailed Jan. 27, 2011.
Goodarzi, G.A. et al.: "Integrated Auxiliary Drives for Fuel Cell Vehicles", Vehicle Power and Propulsion, 2005 IEEE Conference, Chicago, IL, USA, Sep. 7-9, 2005, Piscataway, NJ, USA, IEEE, Sep. 7, 2005, pp. 619-623.
Haiping, Xu et al.: "High Power Inter-leaved Boost Converter in Fuel Cell Hybrid Electric Vehicle", Electric Machines and Drives, 2005 IEEE International Conference on May 15, 2005, Piscataway, NJ, USA, IEEE, May 15, 2005, pp. 1814-1819.
Mahshid Amirabadi et al.: "Fuzzy Control of a Hybrid Power Source for Fuel Cell Electric Vehicle using Regenerative Braking Ultracapacitor", 12th International Power Electronics and Motion Control Conference, IEEE, PI, Aug. 1, 2006, pp. 1389-1394.
Tao H. et al.: "Multi-input bidirectional DC-DC converter combining DC-link and magnetic-coupling for fuel cell systems", Conference Record of the 2005 IEEE Industry Applications Conference Fortieth IAS Annual Meeting Oct. 2-6, 2005, Kowloon, Hong Kong, China, Conference Record of the 2005 IEEE Industry Applications Conference Fortieth IAS Annual Meeting (IEEE Cat. No. 5), vol. 3, Oct. 2, 2005, pp. 2021-2028.

\* cited by examiner

FUEL CELL SYSTEM

This is 371 national phase application of PCT/IB2010/001021 filed 4 May 2010, claiming priority to Japanese Patent Application No. 2009-142895 filed 16 Jun. 2009, the contents of which are incorporated herein by reference.

BACKGROUND OF THE INVENTION

1. Field of the Invention

The invention relates to a fuel cell system that includes a fuel cell that generates electricity using a fuel gas and an oxidizing gas, a vehicle-driving motor inverter, an accessory motor inverter, and a converter that supplies output voltage of the fuel cell to the vehicle-driving motor inverter and the accessory motor inverter after raising the voltage.

2. Description of the Related Art

A fuel cell system that is mounted in a fuel cell vehicle or the like, and that drives a vehicle-driving motor provided as a drive source of the vehicle by supplying the motor with electric power from a fuel cell stack is known. The fuel cell stack generates electricity using a fuel gas and an oxidizing gas.

Besides, Japanese Patent Application Publication No. 2004-146118 (JP-A-2004-146118) discloses a fuel cell system that includes a fuel cell stack that supplies electric power to a vehicle-driving motor and an air compressor for supplying an oxidant to the fuel cell stack, a secondary battery, voltage conversion means that is connected to the fuel cell stack and that performs an operation of extracting electric power from the secondary battery and boosting the voltage or that performs an operation of supplying electric power to the secondary battery after lowering the voltage of the electric power, and control means. The control means, when activating the fuel cell stack, controls the voltage conversion means so that the voltage conversion means performs a voltage-boosting operation of boosting the electric potential at a connection point between the air compressor side of the fuel cell stack and the voltage conversion means to a voltage that is higher than the open-circuit voltage of the fuel cell stack, and therefore electric power of the secondary battery is supplied to the air compressor, and, after operating the air compressor for a certain time, performs a voltage-lowering operation of lowering the voltage from the level that is higher than the open-circuit voltage, so that electric power from the fuel, cell stack is supplied to the air compressor.

Besides, a fuel cell system capable of supplying a vehicle-driving motor and an accessory, such as an air compressor for supplying an oxidizing gas to a fuel cell stack, with electric power from the fuel cell stack, via a shared converter that performs a voltage-converting operation, is also conceivable. In this case, the converter is provided between the fuel cell stack and both the vehicle-driving motor and accessories. According to this construction, the voltage of the fuel cell stack can be raised by a converter, and then can be supplied to the vehicle-driving motor and the air compressor.

In the fuel cell system in which the converter is provided between the fuel cell stack and both the vehicle-driving motor and accessories, the input voltages to the vehicle-driving motor and the input voltage to the accessories, such as the air compressor and the like, are the same. The input voltage to the accessories herein is actually the input voltage to the accessory motors for driving accessories. In some other cases, the service voltage range of the vehicle-driving motor is designed as being a certain range, and the voltage of the accessory motors is designed as being the lowermost limit of the service voltage range of the vehicle-driving motor. Since the service voltage of the accessory motors changes according to the actual service voltage of the vehicle-driving motor, accessory motors in actual use are sometimes operated at a voltage that is higher than the designed voltage, which becomes a factor of deterioration of efficiency. Therefore, it is desired that the designed values of the service voltages of the accessory motors be close to their actual service voltages.

On another hand, if the service voltage of the accessory motor is designed as being a voltage that is higher than the foregoing lowermost limit of the service voltage of the vehicle-driving motor, the input voltage to the vehicle-driving motor is boosted in response to a demand from an accessory motor every time there is a transition response during the operation of the fuel cell stack, for example, every time the fuel cell vehicle undergoes acceleration or the like. Due to such frequent performance of the voltage boost operation by the converter, the loss may possibly become large, and the efficiency of the system as a whole may possibly deteriorate.

SUMMARY OF THE INVENTION

The inventors of this application considered that a cause of the foregoing inconvenience is that a transition response for which the converter needs to greatly boost the voltage, and a transition response for which the converter needs only to boost the voltage by small amount are not clearly distinguished. Then, the inventors have reached an idea that in order to substantially eliminate the inconvenience, it is important to vary the required voltages of the accessory motors according to the degrees of the acceleration demands of the accessory motors.

In the fuel cell system having a construction in which a converter is provided between a fuel cell and a vehicle-driving motor, the invention realizes a structure that heightens the transition responsiveness and also improves efficiency and reduces fuel consumption.

A fuel cell system in accordance with the invention includes: a fuel cell that generates electricity using a fuel gas and an oxidizing gas; a vehicle-driving motor inverter that is supplied with direct-current electric power and supplies alternating-current electric power to a vehicle-driving motor; an accessory motor inverter that is supplied with direct-current electric power and supplies alternating-current electric power to an accessory motor; a converter that is provided between the fuel cell and both the vehicle-driving motor and accessory motor, and that boosts output voltage of the fuel cell and supplies the output voltage boosted to the vehicle-driving motor inverter and the accessory motor inverter; voltage acquisition means for acquiring a required voltage of the vehicle-driving motor, and for acquiring a required voltage of the accessory motor according to a target accessory motor torque based on an acceleration demand of the accessory motor; and converter control means for setting a voltage boost ratio of the converter and controlling the converter by comparing the acquired required voltage of the accessory motor and the required voltage of the vehicle-driving motor.

The voltage acquisition means may acquire the required voltage of the vehicle-driving motor according to target drive motor torque.

In the fuel cell system in accordance with the invention, the converter control means may set the voltage boost ratio of the converter and may control the converter so that, of the required voltage of the vehicle-driving motor and the required voltage of the accessory motor acquired, a higher required voltage is output from the converter.

The fuel cell system may further include command means capable of commanding either one of an economy mode in which fuel economy of the vehicle is given priority and a power mode in which acceleration performance of the vehicle is given priority, and if the economy mode is commanded, the converter control means may set the voltage boost ratio of the converter and may control the converter so that, of the required voltage of the vehicle-driving motor and the required voltage of the accessory motor, the required voltage of the vehicle-driving motor is output from the converter, and if the power mode is commanded, the converter control means may set the voltage boost ratio of the converter and may control the converter so that, of the required voltage of the vehicle-driving motor and the required voltage of the accessory motor, a higher required voltage is output from the converter.

Besides, the fuel cell system may further include command means capable of commanding either one of an economy mode in which fuel economy of the vehicle is given priority and a power mode in which acceleration performance of the vehicle is given priority, and if the economy mode is commanded and an amount of rise of the target accessory motor torque from a steady state is greater than a predetermined amount of rise that is set beforehand, the converter control means may set the voltage boost ratio of the converter and may control the converter so that, of the required voltage of the vehicle-driving motor and the required voltage of the accessory motor, the required voltage of the vehicle-driving motor is output from the converter. Furthermore, if the power mode is commanded, or if the economy mode is commanded and the amount of rise of the target accessory motor torque from the steady state is less than or equal to a predetermined amount of rise that is set beforehand, the converter control means may set the voltage boost ratio of the converter and may control the converter so that, of the required voltage of the vehicle-driving motor and the required voltage of the accessory motor, a higher required voltage is output from the converter.

The voltage acquisition means may calculate the required voltage of the accessory motor from the target accessory motor torque based on the acceleration demand of the accessory motor and an expected-to-be-reached rotation speed of the accessory motor that is expected to be reached at a start of a next computation step according to the acceleration demand.

The fuel cell system may further include map storage means for storing a map that represents a relation between the target accessory motor torque based on the acceleration demand of the accessory motor and change in the required voltage of the accessory motor, and the voltage acquisition means may acquire the required voltage of the accessory motor from the target accessory motor torque based on the acceleration demand of the accessory motor, with reference to the map.

The fuel cell system may further include determination means for determining which of slow acceleration and fast acceleration is demanded, and a set value of torque that corresponds to rotation speed for accelerating the accessory motor may be switched according to a result of the determination by the determination means.

The fuel cell system may further include command means capable of commanding an economy mode in which fuel economy of a vehicle is given priority and a power mode in which acceleration performance of the vehicle is given priority, and the determination means may determine which of slow acceleration and fast acceleration is demanded, based on the economy mode and the power mode that is commanded by the command means, and the voltage acquisition means may switch the set value of torque that corresponds to the rotation speed for accelerating the accessory motor according to a result of determination by the determination means.

The fuel cell system may further include operation amount detection means for detecting an amount of operation of an acceleration command portion for commanding acceleration of a vehicle, and the determination means may determine which of slow acceleration and fast acceleration is demanded, based on the value detected by the operation amount detection means, and the voltage acquisition means may switch the set value of torque that corresponds to the rotation speed for accelerating the accessory motor according to a result of determination by the determination means.

The fuel cell system may further include operation amount change rate detection means for detecting rate of change in amount of operation of an acceleration command portion for commanding acceleration of a vehicle, and the determination means may determine which of slow acceleration and fast acceleration is demanded, based on the value detected by the operation amount change rate detection means, and the voltage acquisition means may switch the set value of torque that corresponds to the rotation speed for accelerating the accessory motor according to a result of determination by the determination means.

The fuel cell system may further include vehicle speed detection means for detecting speed of a vehicle, and the determination means may determine which of slow acceleration and fast acceleration is demanded, based on the detected value of vehicle speed, and the voltage acquisition means may switch the set value of torque that corresponds to the rotation speed for accelerating the accessory motor according to a result of determination by the determination means.

The fuel cell system may further include temperature detection means for detecting temperature of the accessory motor, and the voltage acquisition means may correct the required voltage of the accessory motor according to the value detected by the temperature detection means.

The accessory motor may be an air compressor motor that drives the fuel cell air compressor.

According to the fuel cell system in accordance with the invention, in the construction in which the converter is provided between the fuel cell and both the vehicle-driving motor and the accessory motor, the required voltage of the accessory motor is acquired according to the target accessory motor torque based on the acceleration demand of the accessory motor, and the voltage boost ratio of the converter is set by comparing the acquired required voltage of the accessory motor with the required voltage of the vehicle-driving motor. Therefore, according to the set condition, the required voltage of the accessory motor can be set high at the time of transition response with high acceleration demand, and the required voltage of the accessory motor can be set low at the time of transition response with low acceleration demand. Therefore, it is possible to realize a structure capable of heightening the transition responsiveness and also restraining the unnecessarily great voltage boost operation of the converter, and thus improving efficiency and achieving good fuel economy.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
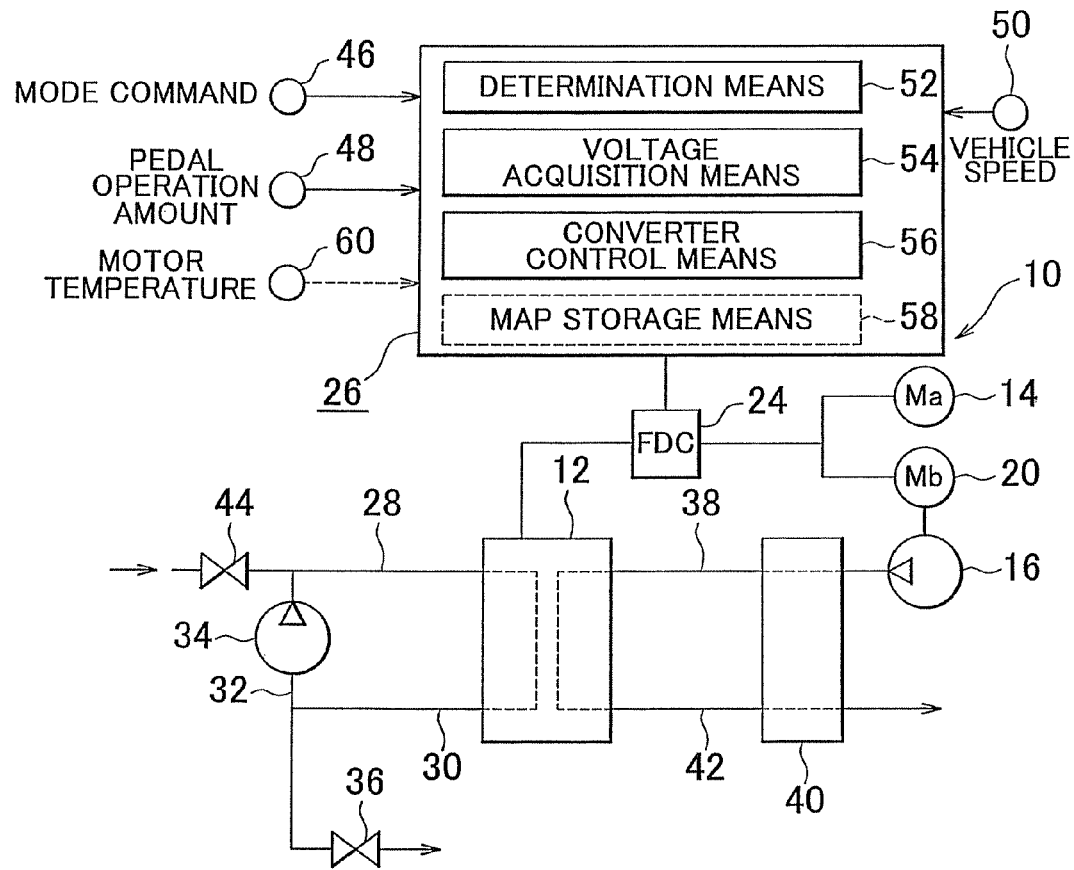
FIG. 1 is a diagram showing a basic construction of a fuel cell system in accordance with an embodiment of the invention.

Embodiments of the invention will be described in detail hereinafter with reference to the drawings. FIGS. 1 to 5 show an embodiment of the invention. As shown in FIG. 1, a fuel cell system 10 is, for example, mounted in a fuel cell vehicle, and has a fuel cell stack 12 that is a fuel cell battery. The fuel cell stack 12 generates electricity through an electrochemical reaction between a hydrogen gas as a fuel gas and air as an oxidizing gas. From the fuel cell stack 12, electric power can be supplied to both a vehicle-driving motor 14 (Ma) (hereinafter, referred to simply as "drive motor 14") that is a drive source for driving a vehicle, and an air compressor 16 as an accessory of the vehicle. Therefore, the fuel cell system 10 includes the fuel cell stack 12, the drive motor 14, a first inverter 18 (described below with reference to FIG. 2) that is a vehicle-driving motor inverter, an air compressor motor 20 (Mb) for driving the air compressor 16, a second inverter 22 (described below with reference to FIG. 2) that is an air compressor motor inverter, a converter 24, and a control portion 26.

The fuel cell stack 12 is formed, for example, by staking a plurality of fuel unit cells and disposing current collecting plates and end plates on two opposite sides of the fuel cell stack 12 in the stacking direction. Then, the fuel unit cells, the current collecting plates and the end plates are fastened together with tie rods, nuts, etc. Incidentally, insulating plates may also be provided between the current collecting plates and the end plates. Each fuel unit cell is, for example, a cell that includes a membrane assembly formed by sandwiching an electrolyte membrane between an anode-side electrode and a cathode-side electrode, and separators disposed on both sides of the assembly. Each fuel unit cell is constructed so that the anode-side electrode can be supplied with a hydrogen gas and the cathode-side electrode can be supplied with air. Hydrogen ions produced at the anode-side electrode are caused to move to the cathode through the electrolyte membrane, and are allowed to undergo an electrochemical reaction with oxygen at the cathode-side electrode, so that along with the production of water, electrons are allowed to move from the anode-side electrode to the cathode-side electrode through an external electrical circuit, thus generating electromotive force.

The hydrogen gas is supplied from a hydrogen gas source (not shown) into a hydrogen gas supply channel 28, and then from the hydrogen gas supply channel 28 to the fuel cell stack 12. After that, the hydrogen gas is subjected to the electrochemical reaction in internal channels of the fuel cell stack 12, and then is discharged through a hydrogen gas discharge channel 30. A return path 32 is provided between the hydrogen gas supply channel 28 and the hydrogen gas discharge channel 30. The return path 32 is provided with a hydrogen pump 34 as a hydrogen circulation pump. The return path 32 is used in order to lead a hydrogen off-gas that is a gas containing unreacted hydrogen that is discharged into the hydrogen gas discharge channel 30, back to the hydrogen gas supply channel 28. Besides, a purge valve 36 as an exhaust drain valve is provided in a downstream side of the hydrogen gas discharge channel 30. A gas-liquid separator (not shown) is provided between the hydrogen gas discharge channel 30 and the return path 32.

Besides, air is pressurized by the air compressor 16 that is provided on an upstream side of the oxidizing gas supply channel 38, and then is supplied to internal channels of the fuel cell stack 12 after passing through a humidifier 40. The air supplied to the internal channels is subjected to the electrochemical reaction, and is discharged through an oxidizing gas discharge channel 42, and then is discharged into the atmosphere after passing through the humidifier 40. The humidifier 40 performs the function of humidifying the air that is about to be supplied to the fuel cell stack 12, by providing the air with moisture obtained from an air-off gas that is a gas containing unreacted air that is discharged from the fuel cell stack 12.

Figure 2:
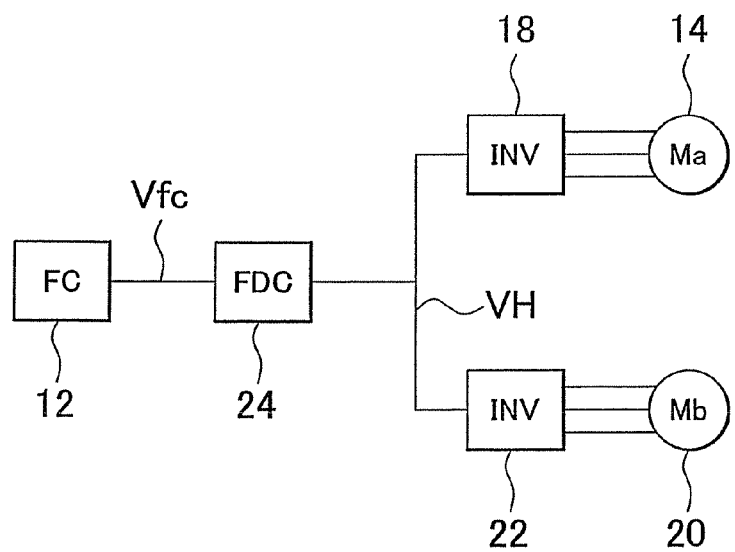
FIG. 2 is a diagram showing a construction of a portion of the system shown in FIG. 1.

The output voltage of the fuel cell stack 12, after being converted into a raised voltage by a converter 24 that is a voltage conversion device and is a DC/DC converter, can be supplied to the drive motor 14, and the air compressor motor 20 for driving the air compressor 16, both of which are loads. As shown in FIG. 2, the converter 24 is actually connected to the first inverter 18 that drives the drive motor 14, and to the second inverter 22 that drives the air compressor motor 20. The first inverter 18 is supplied with direct-current electric power, and supplies alternating-current electric power to the drive motor 14, thereby driving the drive motor 14. The second inverter 22 is supplied with direct-current electric power, and supplies alternating-current electric power to the air compressor motor 20, thereby driving the air compressor motor 20.

The converter 24 boosts the output voltage of the fuel cell stack 12 before supplying the voltage to the first inverter 18 and the second inverter 22. That is, the converter 24 supplies the first inverter 18 and the second inverter 22 with currents at equal voltages. The voltage boosting operation of the converter 24 is controlled by the control portion 26 shown in FIG. 1. The control portion 26 acquires, for example, a signal that represents a load demand, such as the vehicle accelerator pedal operation amount or the like, and signals that represent information detected by various sensors, such as a pressure sensor, a temperature sensor, etc., that detect states of the fuel cell stack 12 or the interior of a channel, and accordingly controls the converter 24 and the various inverters 18 and 22 (FIG. 2) so as to control the states of operation of the drive motor 14 and the air compressor motor 20. For example, the control portion 26 controls the amount of air supplied to the fuel cell stack 12 by controlling the amount of the driving of the air compressor motor 20. Besides, the control portion 26 also controls the hydrogen pump 34 (FIG. 1), and the opening and closing of a gas supply valve 44 provided in the hydrogen gas supply channel 28, the purge valve 36, etc. The control portion 26 includes a microcomputer that has a CPU, a memory, etc.

As shown in FIG. 2, the voltage Vfc of the fuel cell stack 12 is boosted by the converter 24, and, for example, can be boosted to the range from 300 V through 650V. In this case, the voltage boost ratio of the converter 24 is set, for example, in such a manner that, of the required voltage of the drive motor 14 and the required voltage of the air compressor motor 20, the higher required voltage is output from the converter 24. However, if the voltage boost ratio of the converter 24 is high, the efficiency of the converter 24 declines to, for example, 90% or the like. Therefore, it is not preferable that the voltage boost ratio is increased very often. This embodiment is intended to improve this point, which needs to be improved.

Besides, the fuel cell system 10, as shown in FIG. 1, includes a mode command portion 46 that is mode command means, a pedal operation amount sensor 48 that detects the amount of operation of the accelerator pedal and that is an acceleration command portion for commanding acceleration of the vehicle, and a vehicle speed sensor 50 that detects the speed of the vehicle. The mode command portion 46 is a switch, a button, etc., that is operable by an operating person, and makes it possible to selectively command one of the "economy mode" in which the fuel economy of the vehicle is given priority and the "power mode" in which the accelerating performance of the vehicle is given priority. Incidentally, it is also possible to adopt a construction in which the economy mode and the power mode are selectively displayed in a display that is provided in an instrument panel or its surrounding area, and the mode can be selectively command through the use of a touch panel, or through operation of a button or the like.

Besides, the control portion 26 includes determination means 52, voltage acquisition means 54, and converter control means 56. The determination means 52 determines which one of slow acceleration and fast acceleration is to be required taking the present state into account, through the use of at least one of the signal that represents the mode commanded by the mode command portion 46 and the detection signal from the pedal operation amount sensor 48.

The voltage acquisition means 54 calculates, that is, acquires, the required voltage of the air compressor motor 20 according to a target air compressor motor torque based on the acceleration demand of the air compressor motor 20, and calculates, that is, acquires, a required voltage of the drive motor 14 according to the target drive motor torque. The target drive motor torque is calculated by the voltage acquisition means 54, or an external control portion (not shown), through the use of, for example, detected values from the pedal operation amount sensor 48 and the vehicle speed sensor 50, and the like. The target drive motor torque that is a calculated value from an external control portion is input to the control portion 26.

Besides, in the case where the required voltage of the air compressor motor 20 is calculated, the voltage acquisition means 54 calculates the required voltage of the air compressor motor 20 from the target air compressor motor torque based on the acceleration demand of the air compressor motor 20, and from an expected-to-be-reached rotation speed of the air compressor motor 20 that is expected to be reached at the start of the next computation process according to the acceleration demand. That is, the voltage acquisition means 54 calculates a required voltage of the air compressor motor 20 which allows the achievement of the target air compressor motor torque based on the acceleration demand of the air compressor motor 20 and the expected-to-be-reached rotation speed of the air compressor motor 20 which is expected to be reached at the start of the next computation process according to the acceleration demand of the air compressor motor 20.

For example, the determination means 52 determines the acceleration demand of the air compressor motor 20 from the selected mode that is represented by the input signal from the mode command portion 46, the acceleration of the vehicle, etc. In the case where the selected mode is the economy mode, the determination means 52 determines that the present state is a state in which slow acceleration is required. On the other hand, in the case where the selected mode is the power mode, the determination means 52 determines that the present state is a state in which fast acceleration is required. The voltage acquisition means 54 switches the set value of torque corresponding to the rotation speed for the acceleration of the air compressor motor 20 according to a result of the determination.

The converter control means 56 compares the calculated required voltage of the air compressor motor 20 and the required voltage of the drive motor 14, and sets the voltage boost ratio of the converter 24 according to the comparison, and then accordingly controls the converter 24. More concretely, the converter control means 56 sets the voltage boost ratio of the converter 24 and accordingly controls the converter 24 so that converter 24 outputs the higher voltage of the required voltage of the air compressor motor 20 and the required voltage of the drive motor 14. However, in this embodiment, in the case where the economy mode is set, the voltage boost ratio of the converter 24 is set as described below. It is to be noted herein that the invention is also applicable to a vehicle that does not have a function of setting the economy mode or the power mode. In that case, the voltage boost ratio of the converter 24 is set so that the converter 24 outputs the higher one of the required voltage of the air compressor motor 20 and the required voltage of the drive motor 14. Besides, in the case of a vehicle capable of setting a mode other than the economy mode and the power mode, the voltage boost ratio of the converter 24 is set so that the converter 24 outputs the higher one of the required voltage of the air compressor motor 20 and the required voltage of the drive motor 14 in that mode.

Figure 3:
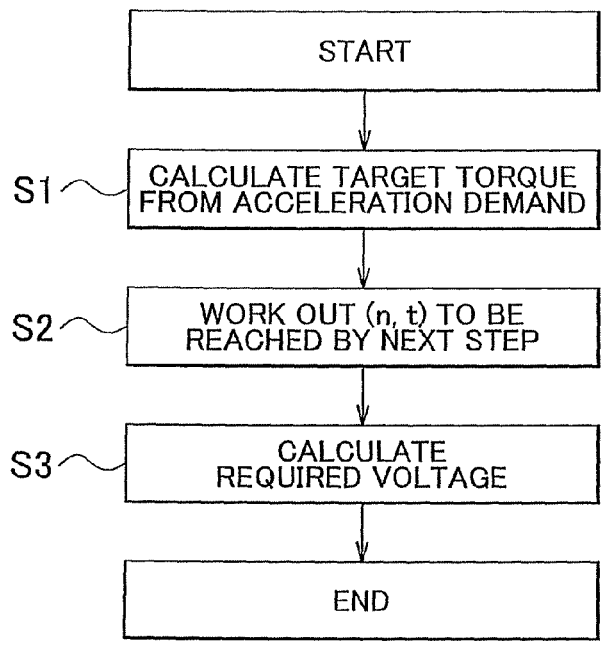
FIG. 3 is a flowchart showing a method of calculating a required voltage of an air compressor motor in the system shown in FIG. 1.
Figure 4:
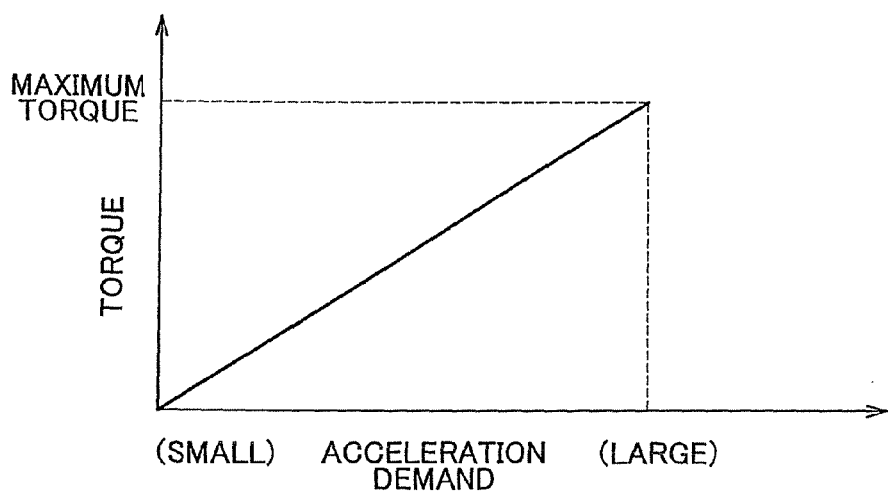
FIG. 4 is a diagram showing an example of a relation between the acceleration demand and the target torque of the air compressor motor.
Figure 5:
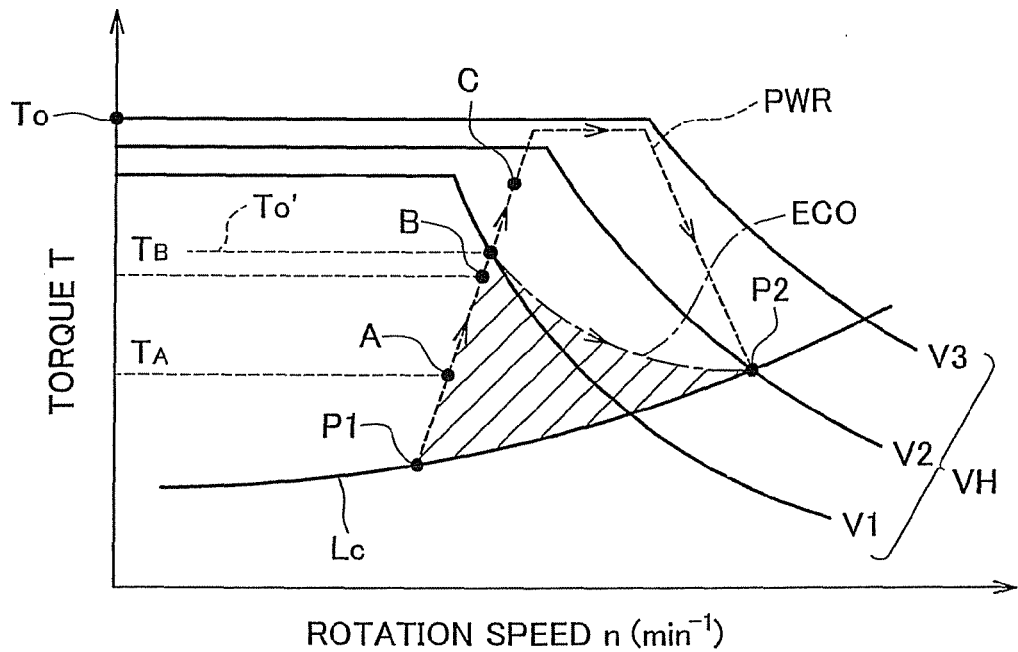
FIG. 5 is a diagram illustrating a range of operation in two examples of a transition response in the case where the required voltage of the air compressor motor is calculated in the system shown in FIG. 1, in the illustration of a relation between the rotation speed and the torque of the air compressor motor.

Next, an example of the method of calculating the required voltage of the air compressor motor 20 (FIG. 1) after the acceleration demand is determined by the determination means 52 (FIG. 1) will be described with reference to FIGS. 3 to 5. FIG. 3 is a flowchart showing an example of the method of calculating the required voltage of the air compressor motor in the system shown in FIG. 1. FIG. 4 is a diagram showing an example of a relation between the acceleration demand and the target torque of the air compressor motor. FIG. 5 is a diagram illustrating a range of operation at the time of transition response between the power mode and the economy mode in the case where the required voltage of the air compressor motor is calculated in the system shown in FIG. 1, in the illustration of a relation between the rotation speed and the torque of the air compressor motor. In the description below, the same elements as those shown in FIGS. 1 and 2 are represented by the same reference characters.

Firstly, in the case where the required voltage of the air compressor motor 20 is calculated, a target air compressor torque is calculated in step S1 in FIG. 3 according to the acceleration demand of the air compressor motor 20 which has been determined by the determination means 52. That is, as is apparent from the relation shown in FIG. 4, the higher the acceleration demand of the air compressor motor 20, the higher the target torque of the air compressor motor 20 becomes. Besides, the acceleration demand of the air compressor motor 20 is made so that, for example, in the case where the electricity generation load of the fuel cell stack 12 increases according to the acceleration of the vehicle or the like, the torque of the air compressor motor 20 is increased along with the rise of the need to increase the amount of supply of air to the fuel cell stack 12 by heightening the rotation speed of the air compressor 16. Besides, in a transition state of the air compressor motor 20 from a steady operation state to a high rotation speed state, the target torque is determined according to the acceleration demand for fast acceleration or slow acceleration.

In FIG. 5, a curve Lc represents a load torque curve, and a dashed one-dotted line ECO represents a curved line that shows a transition state that occurs at the time of acceleration during the economy mode, and an interrupted line PWR represents a curve that shows a transition state that occurs in the case of acceleration in the power mode. Besides, V1, V2 and V3 represent isobaric curves of the input voltage VH (see FIG. 2) of the second inverter 22 that is the input side of the air compressor motor 20. In the order of V1, V2 and V3, the voltage becomes larger (V1<V2<V3). As shown in FIG. 5, in this embodiment, for example, in the case where the air compressor motor 20 is accelerated from a steady state P1 that has certain values of the rotation speed and the torque to a steady state P2 that has other values of the rotation speed and the torque thereof, the acceleration of the air compressor motor 20 is determined according to the extent by which the target torque in the transition state is increased relative to the torque of the load torque curve.

For example, as shown in FIG. 5, it is possible to adopt a construction in which the foregoing transition follows different paths when the economy mode has been commanded and when the power mode has been commanded, because of different relations between the torque and the rotation speed. That is, when the power mode has been commanded, it is determined by the determination means 52 that the present state is a state in which fast acceleration is required. Therefore, as for the voltage VH, the voltage requirement increases from the voltage V1 to the voltage V2 and then to the voltage V3, and then declines to the voltage V2. That is, when the power mode has been commanded, it is determined by the determination means 52 that the present state is a state in which fast acceleration is required. Therefore, regarding the voltage VH, the voltage requirement increases from the voltage of P1 to a point on the curve of the voltage V1 at which the torque is high, and then further increases to the voltages V2 and V3. After that, the voltage requirement declines again to V2, and thus the state shifts to the steady state P2. In this case, the amount of voltage boost is large, so that the acceleration of the air compressor motor 20 is great.

In the case where the economy mode has been commanded, it is determined by the determination means 52 that the present state is a state that demands slow acceleration. Therefore, while the voltage requirement regarding the voltage VH increases from the voltage V1 to the voltage V2, the torque lowers from the point of a high torque on the curve of the voltage V2, so that the state shifts to the steady state P2. In this case, the amount of voltage boost is smaller than in the case where the power mode has been commanded, and therefore the acceleration of the air compressor motor 20 is also lower. That is, in this embodiment, the voltage acquisition means 54 switches the set value of the torque that corresponds to the rotation speed at the time of accelerating the air compressor motor 20, according to the result of the determination by the determination means 52.

In this case, the target torque of the air compressor motor 20 is output in the following manner. That is, the control portion 26 calculates an electric current command that corresponds to the target torque while the input voltage has been set. Then, the control portion 26 outputs a drive control signal commensurate with the electric current command to the second inverter 22. In this manner, the target torque can be output. The acceleration of the air compressor motor 40 is determined according to the difference between the torque of the air compressor motor 20 and the torque on the load-torque curve Lc. Therefore, during the power mode in which the target torque is high, the air compressor motor 20 can be accelerated at sufficiently high acceleration, so that the responses at the time of transition response can be heightened.

On the other hand, during the economy mode in which the target torque is low, the responsiveness at the time of transition response becomes low. However, during the economy mode, the driver's demand regarding acceleration is relatively low, no practical problem occurs. Besides, since the transition can be accomplished without the converter 24 unnecessarily boosting the voltage to a great extent, the efficiency of the converter 24 can be heightened, and low fuel consumption can be achieved.

This embodiment is based on the foregoing principle. In step S1 in FIG. 3, according to the acceleration demand of the air compressor motor 20 determined by the determination means 52, the target torque of the air compressor motor 20 is calculated. Then in step S2, an expected-to-be-reached rotation speed and an expected-to-be-reached torque of the air compressor motor 20 which are expected to be reached at the start of the next computation process according to the acceleration demand are calculated. Next, in step S3, a required voltage of the air compressor that will achieve the expected-to-be-reached rotation speed and the expected-to-be-reached torque is calculated. For example, in the case where the power mode is commanded, a torque near at or near $T_O$ in FIG.5 is calculated as a target torque, and the expected-to-be-reached rotation speed and torque in each computation process are calculated as the rotation speed n and the torque T that correspond to the point A, B or C. Therefore, for example, in each of the computation processes corresponding to the points P1, A and B, it is possible to calculate the expected rotation speed and the expected torque that are expected to be reached at the start of the next computation process that corresponds to the point A, B or C. For example, in the case where while a torque of 10 Nm is being output at 6000 $min^{-1}$ and 290 V in the present computation process, it is expected that 6200 $min^{-1}$ will be reached and a torque of 20 Nm will need to be output, a voltage (e.g., 300 V) that will achieve the torque of 20 Nm at 6200 $min^{-1}$ is calculated as the required voltage of the air compressor motor 20 in the present computation process.

On the other hand, in the case where the economy mode is commanded, the torque $T_O'$ in FIG. 5 is calculated as a target torque, and the expected-to-be-reached rotation speed n and the expected-to-be-reached rotation torque T in each computation process are accordingly calculated. Then, in each computation process, the voltage that will achieve the expected-to-be-reached rotation speed and torque at the start of the next computation process can be calculated as a required voltage of the air compressor motor 20. In the case where the economy mode is commanded, the torque and the rotation speed are set on the path that passes along the left and right-side edges of a region that is shown by hatching in FIG. 5.

According to the foregoing fuel cell system 10, in the construction in which the converter 24 is provided between the fuel cell stack 12 and both the drive motor 14 and the air compressor motor 20, the required voltage of the air compressor motor 20 is calculated according to the target air compressor motor torque based on the acceleration demand of the air compressor motor 20, and the voltage boost ratio of the converter 24 is set by comparing the required voltage of the air compressor motor 20 and the required voltage of the drive motor 14. Therefore, at the time of a transition response with a high acceleration demand, the required voltage of the air compressor motor 20 can be set high. On the other hand, at the time of a transition response with a low acceleration demand, the required voltage of the air compressor motor 20 can be set low. In consequence, it is possible to realize a structure capable of heightening the transition responsiveness and also restraining the unnecessarily great voltage boost operation of the converter 24, and thus improving efficiency and achieving good fuel economy. That is, in the case where the economy mode is commanded, the voltage boost ratio of the converter 24 is set and the converter 24 is controlled so that, of the required voltage of the drive motor 14 and the required voltage of the air compressor motor 20, the required voltage of the drive motor 14 is output from the converter 24. In the case where the power mode is commanded, the voltage boost ratio of the converter 24 is set and the converter 24 is controlled so that, of the required voltage of the drive motor 14 and the required voltage of the air compressor motor 20, the higher required voltage is output from the converter 24.

Incidentally, when the target torque of the air compressor motor 20 is to be found, it is also possible to calculate an appropriate target torque for every acceleration demand according to the relation between the present rotation speed of the air compressor motor 20 and the post-transition rotation speed thereof. For example, the determination means 52, instead of determining one of the state that demands fast acceleration and the state that demands slow acceleration as the present acceleration demand, may calculate the acceleration demand of the air compressor motor 20 or find the acceleration demand of the air compressor motor 20 through the reference to a map or the like on the basis of the rotation speed and the torque of the air compressor motor 20 in the present steady state, the rotation speed and the torque of the air compressor motor 20 in a post-transition steady state, and the fast-acceleration or slow-acceleration demand mode based on the input from the mode command portion 46 or the like, and may acquire by calculation or the like the target air compressor motor torque according to the acceleration demand.

Figure 6:
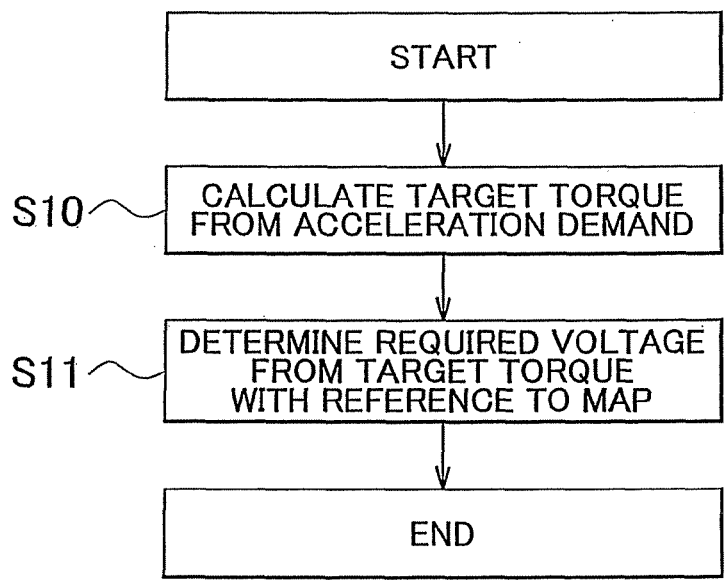
FIG. 6 is a flowchart showing a method of calculating the required voltage of the air compressor motor in another example embodiment of the invention.

FIG. 6 is a flowchart showing a method of calculating the required voltage of the air compressor motor in another example embodiment of the invention. In this embodiment, a fuel cell system 10 includes map storage means 58 (see FIG. 1) that stores a map that represents the relation between the target air compressor motor torque based on the acceleration demand of the air compressor motor 20 and the change in the required voltage of the air compressor motor 20. Then, the voltage acquisition means 54 acquires the required voltage of the air compressor motor 20 from the target air compressor motor torque based on the acceleration demand of the air compressor motor 20, with reference to the map.

That is, in step S10 in FIG. 6, the target air compressor torque is calculated from the acceleration demand of the air compressor motor 20, as in step S1 in FIG. 3. Next, in step S11, the voltage acquisition means 54 acquires the required voltage of the air compressor motor 20 from the target air compressor motor torque based on the acceleration demand of the air compressor motor 20, with reference to the map stored by the map storage means 58. According to this construction of the second embodiment, the calculation process in step S2 in FIG. 3 can be omitted, unlike the first embodiment.

Besides, in the foregoing embodiments, the determination means 52 may also determine whether, regarding the air compressor motor 20, the present state is a state that demands fast acceleration or a state that demands slow acceleration, from the value detected by the pedal operation amount sensor 48, and, according to a result of the determination, the voltage acquisition means 54 may switch the set value of the torque of the air compressor motor 20 that corresponds to the rotation speed thereof for accelerating the air compressor motor 20. In this case, the determination means 52 determines the acceleration demand, for example, in the following manner. That is, the determination means 52 determines that the present state is a state that demands slow acceleration if the amount of depression of the accelerator pedal that is a value detected by the pedal operation amount sensor 48 is less than or equal to a threshold value. On the other hand, if the amount of depression of the accelerator pedal is greater than the threshold value, the determination means 52 determines that the present state is a state that demands fast acceleration.

Besides, in the foregoing embodiments, the determination means 52 may determine whether, regarding the air compressor motor 20, the present state is a state that demands slow acceleration or a state that demands fast acceleration, from the value detected by pedal operation amount change rate detection means (not shown) for detecting the rate of change in the amount of pedal operation detected by the pedal operation amount sensor 48, and, according to a result of the determination, the voltage acquisition means 54 may switch the set value of the torque of the air compressor motor 20 that corresponds to the rotation speed thereof at the time of accelerating the air compressor motor 20. In this case, the determination means 52 determines the acceleration demand, for example, in the following manner. That is, the determination means 52 determines that the present state is a state that demands slow acceleration if the rate of change in the amount of depression of the accelerator pedal which is the value detected by the pedal operation amount change rate detection means, that is, the pedal depression speed, is less than or equal to a threshold value. If the rate of change in the amount of depression of the accelerator pedal is greater than the threshold value, the determination means 52 determines that the present state is a state that demands fast acceleration.

Besides, in the foregoing embodiments, the determination means 52 may determine whether, regarding the air compressor motor 20, the present state is a state that demands slow acceleration or a state that demands fast acceleration from the value detected by the vehicle speed sensor 50 (FIG. 1), and, according to a result of the determination, the voltage acquisition means 54 may switch the set value of the torque of the air compressor motor 20 that corresponds to the rotation speed thereof for accelerating the air compressor motor 20. In this case, the determination means 52 determines the acceleration demand, for example, in the following manner. That is, the determination means 52 determines that the present state is a state that demands slow acceleration if the vehicle speed, which is the value detected by the vehicle speed sensor 50, is less than or equal to a threshold value, and determines that the present state is a state that demands fast acceleration if the vehicle speed is greater than the threshold value. Besides, the determination means 52 is not limited to means for determining one of slow acceleration and fast acceleration as an acceleration demand, but may also be means for determining one of three or more acceleration demands.

Besides, in the foregoing embodiments, the determination means 52 may also determine whether, regarding the air compressor motor 20, the present state is a state that demands slow acceleration or a state that demands fast acceleration, using at least two of the modes commanded by the mode command portion 46, the value detected by the pedal operation amount sensor 48, the value detected by the pedal operation amount change rate detection means, and the value detected by the vehicle speed sensor 50, that is, by a plurality of conditions that employ the foregoing mode or any of the foregoing detected values. For example, the determination means 52 may determine that the present state is a state that demands fast acceleration if a specific condition in which the power mode has been commanded by the mode command portion 46 and the pedal operation amount that is the value detected by the pedal operation amount sensor 48 is greater than or equal to a threshold value is established. In the case where the specific condition is not established and where the pedal operation amount is greater than a second threshold value that is less than the foregoing threshold value, the determination means 52 may determine that the present state is a state that demands slow acceleration.

Besides, in the foregoing embodiments, the converter control means 56 sets the voltage boost ratio of the converter 24 and controls the converter 24 so that, of the required voltage of the air compressor motor 20 and the required voltage of the drive motor 14, the higher required voltage is output from the converter 24. However, the converter control means 56 is also able to operate as follows. That is, in the case where the economy mode is commanded by the mode command portion 46, the converter control means 56 may set the voltage boost ratio of the converter 24 and control the converter 24 so that, of the required voltage of the drive motor 14 and the required voltage of the air compressor motor 20, the required voltage of the drive motor 14 is output from the converter 24, that is, may set the voltage boost ratio of the converter 24 and control the converter 24 on the basis of the demand from the driver motor 14 side. On the other hand, in the case where the power mode is commanded, the converter control means 56 may set the voltage boost ratio of the converter 24 and control the converter 24 so that, of the required voltage of the drive motor 14 and the required voltage of the air compressor motor 20, the higher required voltage is output from the converter 24. In this construction, in the case where the economy mode is commanded, the voltage of the air compressor motor 20, that is, the input voltage of the second inverter 22, is set appropriately according to the required voltage of the drive motor 14. However, during the economy mode, the driver's demand for the acceleration of the air compressor motor 20 is low, there is not a big practical problem, but further reduction in the fuel consumption can be pursued.

In the case where the economy mode is commanded by the mode command portion 46 and where the amount of rise of the target air compressor motor torque from the steady state is greater than a predetermined amount of rise (e.g., +1 Nm) that is set beforehand, the converter control means 56 sets the voltage boost ratio of the converter 24 so that, of the required voltage of the drive motor 14 and the required voltage of the air compressor motor 20, the required voltage of the drive motor 14 is output from the converter 24. Besides, in the case where the power mode is commanded or in the case where the economy mode is commanded and where the amount of rise of the target air compressor motor torque from the steady state is less than or equal to a predetermined amount of rise (e.g., +1 Nm) that is set beforehand, the converter control means 56 may also set the voltage boost ratio of the converter 24 and control the converter 24 so that the higher one of the required voltage of the drive motor 14 and the required voltage of the air compressor motor 20 is output from the converter 24. In this case, the width of the allowable amount that allows determination of the voltage boost ratio of the converter 24 upon the demand from the air compressor motor 20 can be made larger.

Figure 7:
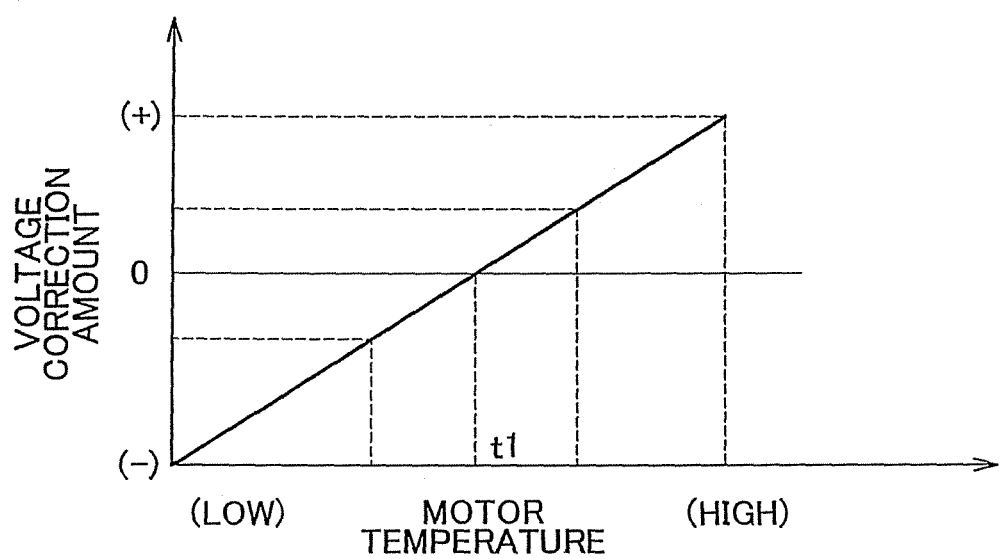
FIG. 7 is a diagram showing an example of a relation between the detected temperature of the air compressor motor and the correction amount of the required voltage of the air compressor in still another embodiment of the invention.

Besides, in the foregoing embodiments, the fuel cell system 10 may further include a motor temperature sensor 60 (see FIG. 1), such as a thermistor that detects the temperature of the air compressor motor 20, or the like. In this case, the voltage acquisition means 54 corrects the required voltage of the air compressor motor 20 according to the value detected by the motor temperature sensor 60. For example, a map that represents a relation between the motor temperature and the voltage correction amount as shown in FIG. 7 is stored in the map storage means 58 (see FIG. 1) beforehand. Then, in the case where the motor temperature is equal to a standard service temperature t1 that is set beforehand, the voltage acquisition means 54 sets "0" as the correction amount for the required voltage of the air compressor motor 20 that is determined from the detected motor temperature with reference to the map. However, for example, if the motor temperature is lower than the standard service temperature t1, the voltage acquisition means 54 sets the voltage correction amount to be low with reference to the map, that is, corrects the required voltage of the air compressor motor 20 to a lower voltage, and compares the post-correction required voltage of the air compressor motor 20 with the required voltage of the drive motor 14. On the other hand, if the motor temperature is higher than the standard service temperature t1, the voltage acquisition means 54 sets the voltage correction amount to be high with reference to the map, that is, corrects the required voltage of the air compressor motor 20 to a higher voltage, and compares the post-correction required voltage of the air compressor motor 20 with the required voltage of the drive motor 14.

The foregoing construction facilitates the appropriate setting of the required voltage according to the motor temperature. That is, if the motor temperature is low, the motor can output a desired torque even when the voltage is relatively low. If the motor temperature is high, there is possibility of failing to output a desired torque if the voltage is not made high. Therefore, according to the state of use of the air compressor motor 20, the efficiency of the system as a whole can be improved. Incidentally, in a certain range of the motor temperature whose center is a standard service temperature, a range thereof in which the voltage correction amount is "0" can be set.

Incidentally, in the foregoing embodiments, the air compressor 16 is an accessory and the air compressor motor 20 is, an accessory motor, the invention is not limited to this construction. For example, the hydrogen pump 34 (see FIG. 1) may be adopted as an accessory (see FIG. 1), and the hydrogen pump motor for driving the hydrogen pump 34 may be an accessory motor.

The invention claimed is:

1. A fuel cell system comprising:
   a fuel cell that generates electricity using a fuel gas and an oxidizing gas;
   a vehicle-driving motor inverter that is supplied with direct-current electric power and supplies alternating-current electric power to a vehicle-driving motor;
   an accessory motor inverter that is supplied with direct-current electric power and supplies alternating-current electric power to an accessory motor;
   a converter that is provided between the fuel cell and both the vehicle-driving motor and accessory motor, and that boosts output voltage of the fuel cell and supplies the output voltage boosted to the vehicle-driving motor inverter and the accessory motor inverter;
   a voltage acquisition device that acquires a required voltage of the accessory motor according to a target accessory motor torque based on an acceleration demand of the accessory motor; and a converter control device that sets a voltage boost ratio of the converter and controlling the converter by comparing the acquired required voltage of the accessory motor and a required voltage of the vehicle-driving motor.

2. The fuel cell system according to claim 1, wherein the voltage acquisition device acquires the required voltage of the vehicle-driving motor according to a target drive motor torque.

3. The fuel cell system according to claim 1, wherein the converter control device sets the voltage boost ratio of the converter and controls the converter so that, of the required voltage of the vehicle-driving motor and the required voltage of the accessory motor acquired, a higher required voltage is output from the converter.

4. The fuel cell system according to claim 1, further comprising
a command device capable of commanding either one of an economy mode in which fuel economy of a vehicle is given priority and a power mode in which acceleration performance of the vehicle is given priority,
wherein:
if the economy mode is commanded, the converter control device sets the voltage boost ratio of the converter and controls the converter so that, of the required voltage of the vehicle-driving motor and the required voltage of the accessory motor, the required voltage of the vehicle-driving motor is output from the converter; and
if the power mode is commanded, the converter control device sets the voltage boost ratio of the converter and controls the converter so that, of the required voltage of the vehicle-driving motor and the required voltage of the accessory motor, a higher required voltage is output from the converter.

5. The fuel cell system according to claim 1, further comprising
a command device capable of commanding either one of an economy mode in which fuel economy of a vehicle is given priority and a power mode in which acceleration performance of the vehicle is given priority,
wherein:
if the economy mode is commanded and an amount of rise of the target accessory motor torque from a steady state is greater than a predetermined amount of rise that is set beforehand, the converter control device sets the voltage boost ratio of the converter and controls the converter so that, of the required voltage of the vehicle-driving motor and the required voltage of the accessory motor, the required voltage of the vehicle-driving motor is output from the converter; and
if the power mode is commanded, or if the economy mode is commanded and the amount of rise of the target accessory motor torque from the steady state is less than or equal to a predetermined amount of rise that is set beforehand, the converter control device sets the voltage boost ratio of the converter and controls the converter so that, of the required voltage of the vehicle-driving motor and the required voltage of the accessory motor, a higher required voltage is output from the converter.

6. The fuel cell system according to claim 1, wherein the voltage acquisition device calculates the required voltage of the accessory motor from the target accessory motor torque based on the acceleration demand of the accessory motor and an expected-to-be-reached rotation speed of the accessory motor that is expected to be reached at a start of a next computation step according to the acceleration demand.

7. The fuel cell system according to claim 1, further comprising
a map storage device that stores a map that represents a relation between the target accessory motor torque based on the acceleration demand of the accessory motor and change in the required voltage of the accessory motor,
wherein the voltage acquisition device acquires the required voltage of the accessory motor from the target accessory motor torque based on the acceleration demand of the accessory motor, with reference to the map.

8. The fuel cell system according to claim 1, further comprising
a determination device that determines which of slow acceleration and fast acceleration a present state demands,
wherein a set value of torque that corresponds to rotation speed for accelerating the accessory motor is switched according to a result of the determination by the determination device.

9. The fuel cell system according to claim 8, further comprising
a command device capable of commanding an economy mode in which fuel economy of a vehicle is given priority and a power mode in which acceleration performance of the vehicle is given priority,
wherein the determination device determines which of slow acceleration and fast acceleration is demanded, based on one of the economy mode and the power mode that is commanded by the command device, and
wherein the voltage acquisition device switches the set value of torque that corresponds to the rotation speed for accelerating the accessory motor according to a result of determination by the determination device.

10. The fuel cell system according to claim 8, further comprising
an operation amount detection device that detects an amount of operation of an acceleration command portion for commanding acceleration of a vehicle,
wherein the determination device determines which of slow acceleration and fast acceleration is demanded, based on the detected amount of operation, and
wherein the voltage acquisition device switches the set value of torque that corresponds to the rotation speed for accelerating the accessory motor according to a result of determination by the determination device.

11. The fuel cell system according to claim 8, further comprising
an operation amount change rate detection device that detects rate of change in amount of operation of an acceleration command portion for commanding acceleration of a vehicle,
wherein the determination device determines which of slow acceleration and fast acceleration is demanded, based on the detected rate of change, and
wherein the voltage acquisition device switches the set value of torque that corresponds to the rotation speed for accelerating the accessory motor according to a result of determination by the determination device.

12. The fuel cell system according to claim 8, further comprising
a vehicle speed detection device that detects speed of a vehicle,
wherein the determination device determines which of slow acceleration and fast acceleration is demanded, based on the detected vehicle speed, and wherein the voltage acquisition device switches the set value of torque that corresponds to the rotation speed for accelerating the accessory motor according to a result of determination by the determination device.

13. The fuel cell system according to claim 1, further comprising
a temperature detection device that detects temperature of the accessory motor,
wherein the voltage acquisition device corrects the required voltage of the accessory motor according to the detected temperature.

14. The fuel cell system according to claim 13, wherein
the voltage acquisition device corrects the required voltage of the accessory motor so that the required voltage of the accessory motor is higher as the detected temperature is higher.

15. The fuel cell system according to claim 1, wherein
the accessory motor is an air compressor motor that drives a fuel cell air compressor.

* * * * *